United States Patent [19]

Dhyanchand et al.

[11] Patent Number: 5,047,914
[45] Date of Patent: Sep. 10, 1991

[54] CURRENT CONTROLLED INVERTER

[75] Inventors: John J. Dhyanchand; Vietson M. Nguyen, both of Rockford, Ill.

[73] Assignee: Sundstrand Corporation, Rockford, Ill.

[21] Appl. No.: 439,685

[22] Filed: Nov. 21, 1989

[51] Int. Cl.$^5$ .......................................... H02M 7/5387
[52] U.S. Cl. ...................................... 363/98; 363/17; 363/132
[58] Field of Search ..................... 363/58, 98, 132, 16, 363/17

[56] References Cited

U.S. PATENT DOCUMENTS

| | | | |
|---|---|---|---|
| 4,502,106 | 2/1985 | Glennon | 363/98 X |
| 4,507,724 | 3/1985 | Glennon | 363/98 |
| 4,541,041 | 9/1985 | Park et al. | 363/98 X |
| 4,670,832 | 7/1987 | Park | 363/98 |
| 4,672,528 | 7/1987 | Park et al. | 363/98 |
| 4,675,799 | 6/1987 | Suzuki et al. | 363/58 |
| 4,816,984 | 3/1989 | Porst et al. | 363/56 |

OTHER PUBLICATIONS

IEEE Transactions on Industrial Electronics and Control Instrumentation, vol. EICI-27, No. 2, May 1980.

Primary Examiner—Steven L. Stephan
Assistant Examiner—Emanuel Todd Voeltz
Attorney, Agent, or Firm—Antonelli, Terry, Stout & Kraus

[57] ABSTRACT

An inverter (100) in accordance with the present invention for producing an AC output potential from a filter (40) containing an inductance (42) through which current flows to a load (12) in accordance with the invention includes first and second switches (Q1 and Q2) in series between a pair of DC reference potentials with each switch having a conductive and a non-conductive state controlled by control signals applied to control terminals of the switch; first and second freewheeling diodes (46) coupled in parallel respectively between first and second terminals of the first and second switches; a current sensor (38) producing a load current signal proportional to current flowing through the inductance to the load; and a controller (102), responsive to an error signal proportional to a difference between an output voltage produced by the inverter applied to the load and a signal proportional to a desired regulated output voltage of the inverter, a current reference signal varying at a frequency equal to the AC output potential and the load current signal, for producing the control signals applied to the switches which turn on the switches only when current is flowing in the freewheeling diode parallel with the switch being turned on.

20 Claims, 4 Drawing Sheets

CURRENT CONTROLLED INVERTER

TECHNICAL FIELD

The present invention relates to inverters in which load current is maintained between a periodically varying upper current level signal varying at the fundamental frequency of an AC voltage produced by the inverter and a periodically varying lower current level signal varying at the fundamental frequency.

BACKGROUND ART

FIG. 1 illustrates a single phase prior art converter employing what is known as "bang bang" control. The inverter 10 produces an AC voltage which varies sinusoidally at a fundamental frequency which is applied to a load 12. The magnitude of the output voltage is controlled by a voltage reference $V_{REF}$ which is proportional to a desired regulated output voltage to be outputted by the inverter to the load 12. The inverter 10 has a voltage control loop 14 which produces an error voltage outputted by summer 16 which is proportional to the difference between the output voltage produced by the inverter and the reference voltage $V_{REF}$. The output voltage is converted from AC to a DC signal by a signal processing circuit 18 which rectifies the AC voltage and low pass filters the rectified voltage for application to the subtracting input of the summer 16. The error signal produced by the summer 16 is applied to error amplifier 20 which may be a PI controller. The amplified error voltage VE produced by error amplifier 20 is multiplied by multiplier 22 with a reference current signal sin •t which varies at the fundamental frequency. Reference signal generator 24, which is comprised of an adder 26, subtractor 28 and DC bias source 30, produces an upper level current signal on input 32 of a window comparator 36 and a lower level current signal on input 34 of the window comparator. The DC bias source 30 produces a fixed level DC bias which is applied to an input of the adder 26 and subtractor 28. The upper level current signal on the input 32 of the window comparator 36 is equal to the sum of the constant DC bias produced by the DC bias source 30 and the output of the multiplier 22. The window comparator 36 changes state each time the current sensed by current sensor 38 matches either of the upper or lower current limit signals inputted on the inputs 32 and 34 of the window comparator 36. The output pulses produced by the window comparator 36 are applied to a signal generator 44 which produces bistable output signals on outputs Q and $\overline{Q}$. The signal generator 44 is a bistable circuit which provides a short zero voltage output level on both of the outputs Q and -Q- in response to an output signal from the window comparator 36 to ensure that shoot-thru does not exist in the transistor switches Q1 and Q2 of the inverter. Freewheeling diodes 46 and snubbing capacitors 48 are connected in parallel with the transistor switches Q1 and Q2 in a conventional fashion. DC power sources 50 supply current which flows through the load 12 in response to turning on of the transistors Q1 and Q2 in conventional fashion. While the inverter is illustrated as a half bridge inverter having two switches, "bang bang" control has also been used for full bridge inverters having four switches.

Current flow through the inductor 42 varies cyclically at a corner frequency higher than the fundamental frequency of the AC voltage outfitted by filter 40. The corner frequency is determined by the inductor and capacitor values of the filter 42 and the spacing between the upper current level signal on input 32 and the lower current level signal on input 34. The envelope of the cyclical current flow defines the fundamental output frequency of the AC produced by the inverter.

The inverter of FIG. 1 has the disadvantage that the switching of the transistors Q1 and Q2 into conduction does not occur only when the freewheeling diodes 46 are conductive. A paper entitled "A Control Strategy for Reference Wave Adaptive Current Generation" authored by R. Palaniappann and J. Vithayathil, IEEE Transactions on Industrial Electronics and Control Instrumentation, Vol. IECI-27, No. 2, May 1980 illustrates in FIG. 1 the upper and lower current level signals like those produced by the adders 26 and 28. The upper and lower current level signals which are respectively applied to inerts 32 and 34 of the window comparator 36 as illustrated in FIG. 1 of the aforementioned publication are not respectively disposed on the positive and negative sides of the zero current flow. As a result the signal generator 44 will turn on one of the transistors Q1 and Q2 when the parallel connected freewheeling diode 46 is not conductive resulting in the transistor being turned on with its parallel connected freewheeling diode not conductive being subjected to increased stress as a result of switching the power supply potential by the transistor and further consuming additional power over that which would be consumed if the transistor is switched on while the freewheeling diode 46 is conductive which clamps the potential across the transistor being switched on to one diode drop.

DISCLOSURE OF THE INVENTION

The present invention provides an inverter having a single or multiple phases in which turning on of switches in the inverter occurs only when current is flowing in a freewheeling diode connected in parallel with the switch being turned on. As a result of the freewheeling diode being turned on during the switching on of the switch, the potential across the switch is limited to one diode drop which lessens stress applied to the switch in comparison to the prior art of FIG. 1 which permitted turning on one of the switches when the freewheeling diode connected in parallel with the switch was not conductive. As a result energy consumption is minimized during the turning on of the switches as a result of limiting the potential across each of the switches to one diode drop and further stress on the switches is limited as a result of limiting the potential across each switch during the turning on of the switch to one diode drop instead of the power supply potential as with the prior art. A signal generator controlling the conductivity of the switches of the inverter in accordance with the present invention commutates the turning on and turning off of the inverter switches in response to each time current flowing through an inductor coupled to an output of the inverter matches either an upper level current signal which varies at a fundamental frequency of the AC output potential produced by the inverter which varies periodically from zero current to a positive maximum current or a lower level current signal which varies at the fundamental frequency periodically from zero current to a negative minimum current. The inverter of the present invention may be utilized in AC power generating systems utilized in airframes as well as for other AC applications such as driving motors.

An inverter for producing an AC output potential from a filter containing an inductance through which current flows to a load in accordance with the invention includes first and second switches coupled in series between a pair of DC reference potentials with each switch having a conductive and a non-conductive state controlled by control signals applied to control terminals of the switch; first and second freewheeling diodes coupled in parallel respectively between first and second terminals of the first and second switches; a current sensor producing a load current signal proportional to current flowing through the inductance to the load; and a controller, responsive to an error signal proportional to a difference between an output voltage produced by the inverter applied to the load and a signal proportional to a desired regulated output voltage of the inverter, a current reference signal varying at a frequency equal to the AC output potential and the load current signal, for producing the control signals applied to the switches which turn on the switches only when current is flowing in the freewheeling diode in parallel with the switch being turned on. The controller includes a signal generator having an input and first and second outputs respectively coupled to the control terminals of the switches, the outputs supplying control signals which respectively are an inversion of each other and which change level in response to each change in signal level applied to the input and circuitry, responsive to the error signal, the current reference signal and the load current signal which produces the change in signal level applied to the input of the signal generator whenever the load current is equal in magnitude to an upper current level signal which is a function of a sum of the error signal and a product of the error signal and the current reference signal or equal in magnitude to a lower current level signal which is a function of a sum of an inversion of the error signal and product of the current reference signal and the error signal. The circuit for producing the change in signal level includes a window comparator. The invention further includes a multiplier, responsive to the error signal and the current reference signal, for producing a product signal proportional to the product of the error signal and the current reference signal; a peak signal detector, responsive to the product signal, for producing a peak signal proportional to the magnitude of the error signal; an adder, responsive to the peak signal and a product signal, for producing the upper current reference signal applied as an input to the window comparator; and a subtractor, responsive to the peak signal and the product signal, for producing the lower current reference signal applied as an input to the window comparator.

The present invention may be implemented in a multiple phase inverter with each phase containing an inverter as described above. A neutral is connected to each phase load driven by the multiple phase inverter; and a capacitor divider having a junction point connected to two capacitors and to the neutral with each of the capacitors coupled to a different DC potential provides a return path for high frequency current to the power supply.

A method for controlling an inverter, which produces an AC output potential from a filter containing an inductance through which current flows to a load, having first and second switches which are respectively connected in parallel with first and second freewheeling diodes in accordance with the invention includes sensing current flowing through the inductance, and generating control signals applied to the switches for turning on the switches in response to the sensed current flowing through the inductance to cause turning on the switches only when current is flowing in the freewheeling diode in parallel with the switch being turned on. The switches are turned on when the load current is equal in magnitude to an upper current level signal which is a function of a sum of an error signal proportional to a difference between an output voltage produced by the inverter applied to the load and a signal proportional to a desired regulated output voltage of the inverter and a voltage equal to a product of the error signal and the current reference signal or equal in magnitude to a lower current level signal which is a function of a sum of an inversion of the error signal and the product of the current reference signal and the error signal. The error signal is produced by peak detection of the product of the error signal and the current reference signal.

In an inverter having first and second switches in series between a pair of DC reference potentials which are switched to produce an AC output voltage, first and second freewheeling diodes coupled in parallel respectively between first and second terminals of the first and second switches with conductivity of the switches being controlled in response to comparison of current flowing in an inductance coupled to the switches and an upper level current signal and lower level current signal, an improvement in accordance with the invention includes providing an upper level current level signal which varies at a fundamental frequency of the AC output potential which varies periodically from zero current to a positive maximum current; providing a lower level current signal which varies at the fundamental frequency periodically from zero current to a negative minimum current; and controlling conductivity of the switches by changing the conductivity of each switch in response to each time current flowing in the inductance matches current of one of the current level signals. The upper level current signal is a function of a sum of an error signal proportional to a difference between the output voltage produced by the inverter and a signal proportional to a desired regulated output potential of the inverter and a voltage equal to a product of the error signal and a current reference varying periodically at the fundamental frequency; and the lower level current signal is a function of a sum of an inversion of the error signal and a product of the current reference and the error signal.

BEST MODE FOR CARRYING OUT THE INVENTION

Figure 1:
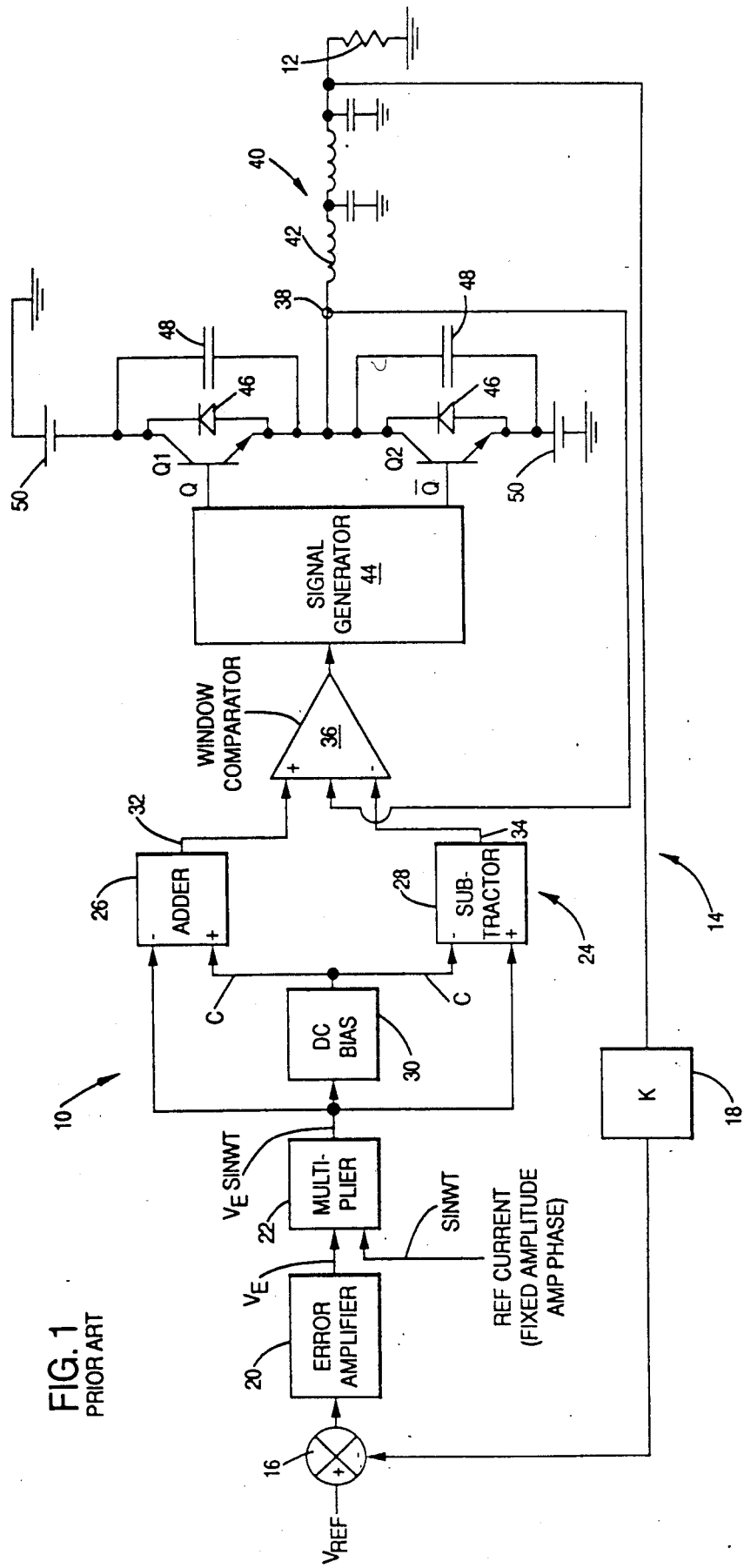
FIG. 1 illustrates a prior art inverter.
Figure 2:
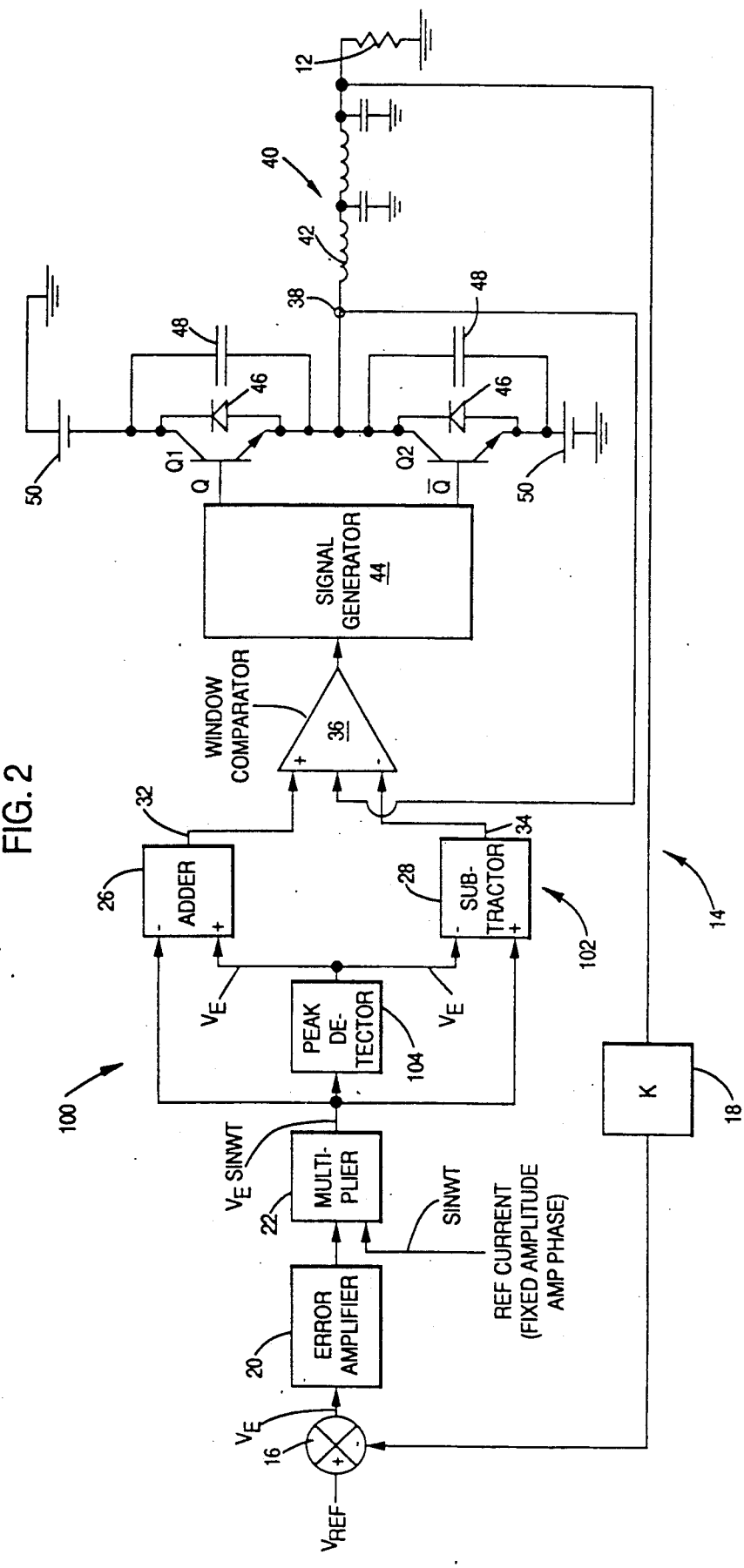
FIG. 2 illustrates a single phase inverter in accordance with the present invention.

FIG. 2 illustrates an embodiment 102 of a single phase inverter in accordance with the present invention. Like reference numerals identify like parts in FIGS. 1 and 2. The embodiment of FIG. 2 differs from FIG. 1 in that the transistor switches Q1 and Q2 are commutated by the signal generator 44 only when their associated parallel connected freewheeling diodes 46 are conductive as contrasted with the prior art in which one of the switches Q1 or Q2 was commutated when its parallel connected freewheeling diode was not conducting resulting in the power supply potential being dropped across the switch being turned on. Turning on of a switch when the power supply potential is dropped across the switch places greater stress on the switch than when the switch is turned on when its parallel connected freewheeling diode 46 is conductive and further consumes greater electrical energy than when the switch is turned on with its freewheeling diode conductive. The signal generator 102 of the embodiment 100 differs from the signal generator 24 in that a peak detector 104 detects the maximum amplitude of the output signal from the multiplier 22 instead of a constant DC bias produced by the DC bias source 30 of the prior art.

Figure 3:
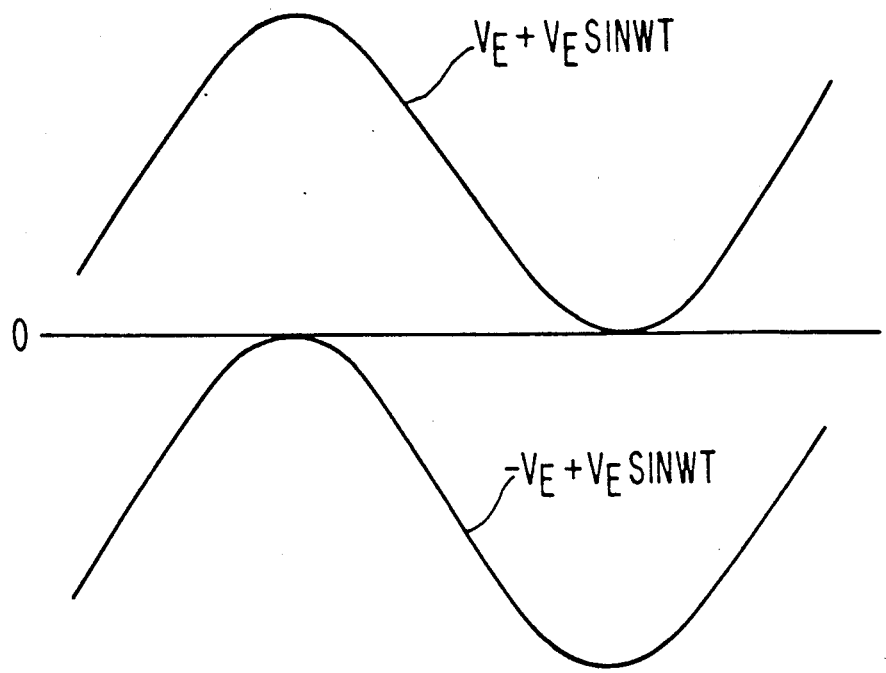
FIG. 3 illustrates the waveforms produced by the reference signal generator of the present invention.

FIG. 3 illustrates the upper current level signal produced by the adder 26 which is inputted to the window comparator 36 on input 32 and the lower current level signal which is produced by subtractor 28 which is inputted on input 34 of the window comparator. The upper current level signal is equal to $V_E + V_E \sin\omega T$. The lower current level signal is equal to $-V_E + V_E \sin\omega t$. The upper current level signal is always positive and the lower current level signal is always negative. As a consequence of the upper current level signal always being positive and the lower current level signal always being negative, each switch Q1 and Q2 is turned on only when its parallel connective freewheeling diode 46 is conductive. The freewheeling diodes 46 are caused to be conductive by the change of slope of the current produced by turning off the switch Q1 or Q2 which is conductive up to the point at which the feedback current signal sensed by sensor 38 has not matched the upper or lower current level signal. At the time that the switch Q1 or Q2 is turned off a potential is induced in inductor 42 which forward biases the freewheeling diode 46 in parallel with the switch Q1 or Q2 which is to be turned on in response to the output signal Q or $\overline{Q}$ produced by generator 44 a short time interval after the transistor which is being turned off has been turned off to avoid shoot-thru.

Figure 4:
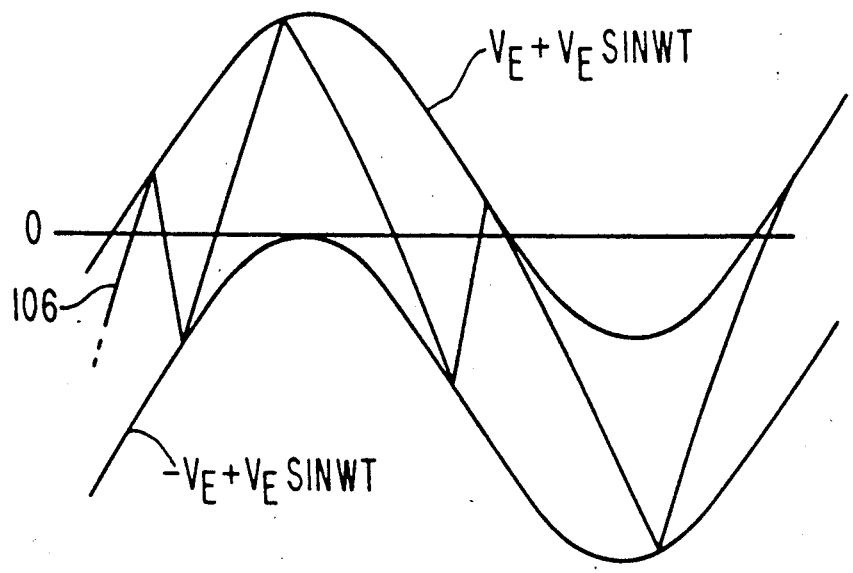
FIG. 4 illustrates the current flow through an inductor connected to the output of the inverter of the present invention.

FIG. 4 illustrates the fluctuation of current in the inductor 42 which is sensed by sensor 38. As illustrated the fluctuation 106 cycles at a corner frequency which is higher than the fundamental frequency of the AC potential outputted by the filter 40 between the upper and lower current level signals. The slope of the current variation in the inductor is determined by the choice of inductance in capacitive values in the filter 40.

Figure 5:
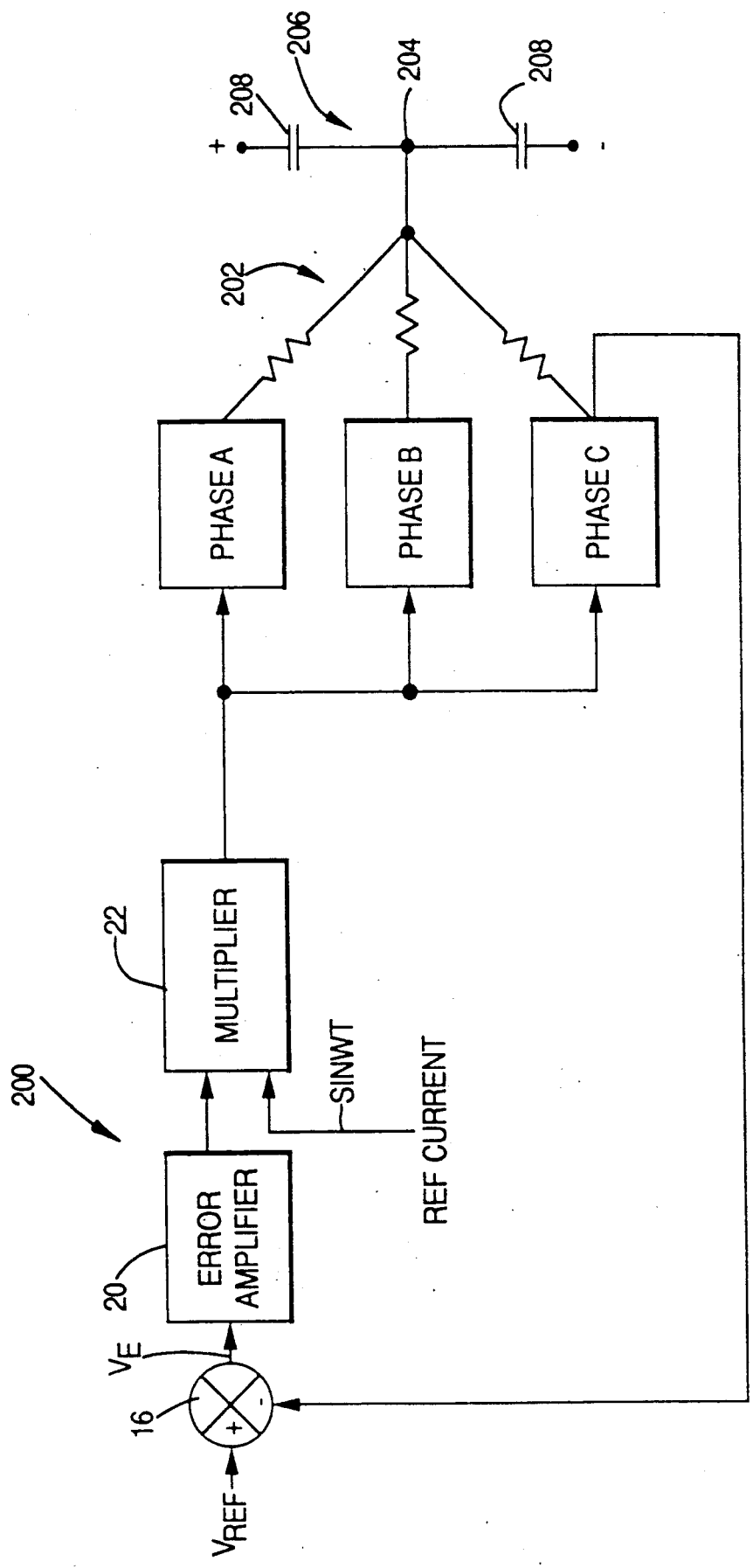
FIG. 5 illustrates a block diagram of a multiple phase embodiment of the present invention.

FIG. 5 illustrates a three phase embodiment 200 of the present invention. Like reference numerals identify like parts in FIGS. 2 and 5. The labelled rectangular blocks "PHASE A", "PHASE B" and "PHASE C" correspond to the parts to the right of the multiplier 22 in FIG. 2 with each of the phases outputting current 120° phase displaced from the other currents to produce a three phase output which respectively drives a three phase load 202 which is connected to a neutral 204. High frequency components present in the output signal are returned to the power supply potential by a capacitor divider 206 which is comprised of individual capacitors 208 which are respectively connected between a neutral 204 and a power supply potential.

While the invention has been described in terms of its preferred embodiments, it should be understood that numerous modifications may be made thereto without departing from the spirit and scope of the present invention. For example, while the embodiment of the invention has been illustrated as a half bridge inverter, it should be understood that the present invention may be practiced with other inverter configurations such as but not limited to a full bridge inverter. It is intended that all such modifications fall within the scope of the appended claims.

We claim:

1. An inverter for producing an AC output potential from a filter containing an inductance through which current flows to a load comprising:

first and second switches coupled in series between a pair of DC reference potentials with each switch having a conductive and a non-conductive state controlled by control signals applied to control terminals of the switch;

first and second freewheeling diodes coupled in parallel respectively between first and second terminals of the first and second switches;

a current sensor producing a load current signal proportional to current flowing through the inductance to the load; and a controller, responsive to an error signal proportional to a difference between an output voltage produced by the inverter applied to the load and a signal proportional to a desired regulated output voltage of the inverter, a current reference signal varying at a frequency equal to the AC output potential and the load current signal, for producing the control signals applied to the switches which turn on the switches only when current is flowing in the freewheeling diode in parallel with the switch being turned on.

2. An inverter in accordance with claim 1 wherein the controller comprises:

a signal generator having an input and first and second outputs respectively coupled to the control terminals of the switches, the outputs applying control signals which respectively are an inversion of each other and which change level in response to each change in signal level applied to the input; and means, responsive to the error signal, the current reference signal, and the load current signal which produces the change in signal level applied to the input of the signal generator whenever the load current is equal in magnitude to an upper current level signal which is a function of a sum of the error signal and a product of the error signal and the current reference signal or equal in magnitude to a lower current level signal which is a function of a sum of an inversion of the error signal and the product of the current reference signal and the error signal.

3. An inverter in accordance with claim 2 wherein the means which produces the change in signal level comprises:

a window comparator.

4. An inverter in accordance with claim 2 further comprising:

a multiplier, responsive to the error signal and the current reference signal, for producing a product signal proportional to the product of the error signal and the current reference signal;

a peak signal detector, responsive to the product signal, for producing a peak signal proportional to the magnitude of the error signal;

an adder, responsive to the peak signal and the product signal, for producing the upper current level signal applied as an input to the means which produces the change in signal level; and a subtractor, responsive to the peak signal and the product signal, for producing the lower current level signal applied as an input to the means which produces the change in signal level.

5. An inverter in accordance with claim 3 further comprising:

a multiplier, responsive to the error signal and the current reference signal, for producing a product signal proportional to the product of the error signal and the current reference signal;

a peak signal detector, responsive to the product signal, for producing a peak signal proportional to the magnitude of the error signal;

an adder, responsive to the peak signal and the product signal, for producing the upper current level signal applied as an input to the window comparator; and a subtractor, responsive to the peak signal and the product signal, for producing the lower current level signal applied as an input to the window comparator.

6. A method for controlling an inverter, which produces an AC output potential from a filter containing an inductance through which current flows to a load, having first and second switches which are respectively connected in parallel with first and second free wheeling diodes comprising:

sensing current flowing through the inductance; and generating control signals applied to the switches for turning on the switches in response to the sensed current switches only when current is flowing in the freewheeling diode in parallel with the switch being turned on.

7. A method in accordance with claim 6 wherein:

the switches are turned on when the load current is equal in magnitude to an upper current level signal which is a function of a sum of an error signal proportional to a difference between an output voltage produced by the inverter applied to the load and a signal proportional to a desired regulated output voltage of the inverter and a voltage equal to a product of the error signal and the current reference signal or equal in magnitude to a lower current level signal which is a function of a sum of an inversion of the error signal and the product of the current reference signal and the error signal.

8. A method in accordance with claim 7 wherein:

the error signal is produced by peak detection of the product of error signal and the current reference signal.

9. A multiple phase inverter having a plurality of phases with each phase producing an AC output potential from a filter containing an inductance through which current flows to a phase load, each phase comprising:

first and second switches coupled in series between a pair of DC reference potentials with each switch having a conductive and a non-conductive state controlled by control signals applied to control terminals of the switch;

first and second freewheeling diodes coupled in parallel respectively between first and second terminals of the first and second switches;

a current sensor producing a load current signal proportional to current flowing through the inductance to the load; and a controller, responsive to an error signal proportional to a difference between an output voltage produced by the phase applied to the phase load and a signal proportional to a desired regulated output voltage of the inverter, a current reference signal varying at a frequency equal to the AC output potential and the load current signal, for producing the control signals applied to the switches which turn on the switches only when current is flowing in the freewheeling diode in parallel with the switch being turned on.

10. A multiple phase inverter in accordance with claim 9 wherein each controller comprises:

a signal generator having an input and first and second outputs respectively coupled to the control terminals of the switches, the outputs applying control signals which respectively are an inversion of each other and which change level in response to each change in signal level applied to the input; and means, responsive to the error signal, the current reference signal, and the load current signal which produces the change in signal level applied to the input of the signal generator whenever the load current is equal in magnitude to an upper current level signal which is a function of a sum of the error signal and a product of the error signal and the current reference signal or equal in magnitude to a lower current level signal which is a function of a sum of an inversion of the error signal and the product of the current reference signal and the error signal.

11. A multiple phase inverter in accordance with claim 10 wherein each of the means which produces the change in signal level comprises:

a window comparator.

12. A multiple phase inverter in accordance with claim 10 further comprising:

a multiplier, responsive to the error signal and the current reference signal, for producing a product signal proportional to the product of the error signal and the current reference signal;

a peak signal detector, responsive to the product signal, for producing a peak signal proportional to the magnitude of the error signal;

an adder, responsive to the peak signal and producing the upper current the product signal, for level signal applied to an input of the means which produces the change in signal level; and a subtractor, responsive to the peak signal and the product signal, for producing the lower current level signal applied to an input of the means which produces the change in signal level.

13. An inverter in accordance with claim 11 further comprising:

a multiplier, responsive to the error signal and the current reference signal, for producing a product signal proportional to the product of the error signal and the current reference signal;

a peak signal detector, responsive to the product signal, for producing a peak signal proportional to the magnitude of the error signal;

an adder, responsive to the peak signal and the product signal, for producing the upper current level signal applied as an input to the window comparator; and a subtractor, responsive to the peak signal and the product signal, for producing the lower current level signal applied as an input to the window comparator.

14. A multiple phase inverter in accordance with claim 9 further comprising:

a neutral connected to each phase load; an a capacitor divider having a junction point connected to two capacitors and to the neutral and each of the capacitors being connected to a different DC potential.

15. A multiple phase inverter in accordance with claim 10 further comprising:

a neutral connected to each phase load; and a capacitor divider having a junction connected to two capacitors and to the neutral and each of the capacitors being connected to a different DC potential.

16. A multiple phase inverter in accordance with claim 11 further comprising:

a neutral connected to each phase load; and having a junction point connected to two capacitors and to the neutral and each of the capacitors being connected to a different DC potential.

17. A multiple phase inverter in accordance with claim 12 further comprising:

a neutral connected to each phase load; and a capacitor divider having a junction point connected to two capacitors and to the neutral and each of the capacitors being connected to a different DC potential.

18. A multiple phase inverter in accordance with claim 13 further comprising:

a neutral connected to each phase load; and a capacitor divider having a junction point connected to two capacitors and to the neutral and each of the capacitors being connected to a different DC potential.

19. In an inverter having first and second switches in series between a pair of DC reference potentials which are switched to produce an AC output voltage, first and second freewheeling diodes coupled in parallel respectively between first and second terminals of the first and second switches with conductivity of the switches being controlled in response to comparison of current flowing in an inductance coupled to the switches with an upper current level signal and a lower current level signal, the improvement comprising:

providing an upper current level signal which varies at a fundamental frequency of the Ac output potential which varies periodically from zero current to a positive maximum current;

providing a lower current level signal which varies at a fundamental frequency periodically from current zero to a negative minimum current; and controlling conductivity of the switches by changing the conductivity of each switch in response to each time current flowing in the inductance matches the current of one of current level signals.

20. An inverter in accordance with claim 19 wherein:

the upper current level signal is a function of a sum of an error signal proportional to a difference between the output voltage produced by the inverter and a signal proportional to a desired regulated output voltage of the inverter and a product of the error signal and a current reference signal varying periodically at the fundamental frequency; and the lower current level signal is a function of a sum of an inversion of the error signal and a product of the current reference signal and the error signal.

* * * * *